United States Patent [19]
Kawakami et al.

[11] Patent Number: 6,007,900
[45] Date of Patent: Dec. 28, 1999

[54] DIELECTRIC PASTE AND THICK-FILM CAPACITOR USING SAME

[75] Inventors: Hiromichi Kawakami, Moriyama; Hiroji Tani, Nagaokakyo, both of Japan

[73] Assignee: Murata Manufacturing Co., Ltd., Japan

[21] Appl. No.: 09/003,478

[22] Filed: Jan. 6, 1998

Related U.S. Application Data

[62] Division of application No. 08/638,951, Apr. 24, 1996, Pat. No. 5,814,571.

[30] Foreign Application Priority Data

Apr. 28, 1995 [JP] Japan ................................. 7-106187

[51] Int. Cl.$^6$ ................. B32B 9/00; H01G 4/06
[52] U.S. Cl. ............. 428/210; 428/702; 361/301.4; 361/321.3; 361/321.5; 501/32
[58] Field of Search .................. 428/210, 702; 361/301.4, 321.3, 321.5; 501/32

[56] References Cited

U.S. PATENT DOCUMENTS

| | | | |
|---|---|---|---|
| 2,692,833 | 10/1954 | Armistead | 106/53 |
| 3,080,328 | 3/1963 | Billian | 501/75 |
| 3,238,151 | 3/1966 | Kim | 501/61 |
| 3,418,156 | 12/1968 | Medert et al. | 428/210 |
| 3,560,327 | 2/1971 | Mills | 161/189 |
| 3,653,933 | 4/1972 | Tsunekawa | 501/75 |
| 4,038,448 | 7/1977 | Boyd et al. | 428/428 |
| 4,070,518 | 1/1978 | Hoffman | 428/209 |
| 4,609,582 | 9/1986 | Joormann et al. | 428/209 |
| 4,618,590 | 10/1986 | Baudry | 501/32 |
| 4,751,148 | 6/1988 | Popma et al. | 428/690 |
| 4,883,705 | 11/1989 | Kawakami et al. | 428/209 |
| 5,004,640 | 4/1991 | Nakatani et al. | 428/195 |
| 5,068,210 | 11/1991 | DiLazzaro et al. | 501/61 |
| 5,145,803 | 9/1992 | Daimer et al. | 501/15 |
| 5,204,292 | 4/1993 | Michimata | 501/61 |

*Primary Examiner*—Deborah Jones
*Assistant Examiner*—Cathy F. Lam
*Attorney, Agent, or Firm*—Ostrolenk, Faber, Gerb & Soffen

[57] ABSTRACT

A dielectric paste used for fabrication of a capacitor which permits manufacture of a small-sized ceramic oscillator by being incorporated in the oscillator. The dielectric paste comprises powdered glass, dielectric powder, and an organic vehicle. The dielectric powder is a lead-based perovskite compound. The powdered glass includes a main component given by $xSiO_2$—$yB_2O_3$—$zPbO$ (where x, y, and z are expressed in mole percent). The x, y, and z lie within a region defined by connecting points A (x=70, y=0, and z=30), B (x=70, y=15, and z=15), C (x=10, y=75, and z=15), and D (x=10, y=0, and z=90). Preferably, at least one member selected from the group consisting of $Al_2O_3$, CaO, $TiO_2$, $ZrO_2$, BaO and MgO is used as an additive. Preferably, glass frit accounts for about 35–95% by weight of the mixture of the powdered glass and the dielectric powder, and the dielectric powder accounts for about 5–65% by weight.

12 Claims, 2 Drawing Sheets

DIELECTRIC PASTE AND THICK-FILM CAPACITOR USING SAME

This is a divisional of application Ser. No. 08/638,951, filed Apr. 24, 1996, and now U.S. Pat. No. 05/814,571.

BACKGROUND OF THE INVENTION

1. Field of the Invention

The present invention relates to a dielectric paste useful as a load capacitor-forming material in a ceramic oscillator. The invention also relates to a thick-film capacitor using such a dielectric paste.

2. Description of the Related Art

Thick-film capacitors have been used as elements of thick-film integrated circuits and in other applications. Such thick-film capacitors generally include a barium titanate-based ceramic as a main component and a glass component or the like as an optional component. For example, Japanese Laid-Open Patent Publication No. 51-48159 discloses a dielectric substance consisting of a $BaTiO_3$—$CaSnO_3$—$CaSiO_3$-based ceramic. Japanese Laid-Open Patent Publication No. 51-150097 discloses dielectric substances made from $BaTiO_3$—$(Pb, Sr)$ $(Ti, Sn)O_3$ and glass.

Such thick-film capacitors have been prepared in the manner described below. Specifically, a dielectric paste is prepared by dispersing a powder of the above-described dielectric substance in an organic vehicle. In some cases, powdered glass may be added to the vehicle. Then the paste is applied to an insulating substrate made of alumina, for example, by screen printing or other method. A plurality of such substrates are combined to form a laminate which is subsequently baked in air, thus completing the thick-film capacitors.

As digital IC technology evolves, ceramic oscillators using piezoelectric ceramics have been frequently employed as devices for generating reference signals in electronic instruments. Normally, a capacitor which is necessary for construction of an oscillator circuit is connected to such a ceramic oscillator. Since electronic devices have decreased in size in recent years, there is an increasing demand for miniaturization of electronic parts such as ceramic oscillators.

Accordingly, attempts have been made to fabricate ceramic oscillators incorporating thick-film capacitors instead of discrete type capacitors as load capacitors used for connection with the ceramic oscillators. However, the conventional dielectric paste contains a large percent of dielectric powder in order to obtain a high dielectric constant. Thus, there arises a problem in that the dielectric film obtained using the dielectric paste is not dense because the powder has a low density. In order to compensate for the low density, a plurality of layers of the dielectric paste must be used in order to increase film thickness. Moreover, in order to make the film more compact, it has been necessary to bake the dielectric film at a high temperature exceeding 900° C.

SUMMARY OF THE INVENTION

It is therefore an object of the present invention to provide a dielectric paste which can be baked at a temperature of 900° C. or less to obtain a compact dielectric film suitably used for fabricating a small-sized ceramic oscillator incorporating a capacitor. It is another object of the invention to provide a thick-film capacitor.

The dielectric paste of the present invention includes powdered glass, dielectric powder, and an organic vehicle. The dielectric powder is made from a lead-based perovskite compound. The chemical formula of the main component of the powdered glass is given by $xSiO_2$—$yB_2O_3$—$zPbO$ (where x, y, and z are expressed in mole percent). The x, y, and z lie within a region defined by connecting points A (x=70, y=0, and z=30), B (x=70, y=15, and z=15), C (x=10, y=75, and z=15), and D (x=10, y=0, and z=90) on a three phase diagram.

The dielectric paste is further characterized in that the Curie point of the dielectric powder preferably lies within the range of from about 120 to 500° C.

A thick-film capacitor of the present invention includes the dielectric layer prepared from the aforementioned dielectric paste.

In one aspect of the invention, the aforementioned powdered glass contains more than about 70 mole percent, preferably at least 80%, of a main component and less than about 30 mole percent, preferably not more than 20%, of at least one additive selected from the group consisting of $Al_2O_3$, $CaO$, $TiO_2$, $ZrO_2$, $BaO$ and $MgO$. The main component is given by $xSiO_2$—$yB_2O_3$—$zPbO$ (where x, y, and z are expressed in mole percent), and the x, y, and z lie within a region defined by connecting points A (x=70, y=0, and z=30), B (x=70, y=15, and z=15), C (x=10, y=75, and z=15), and D (x=10, y=0, and z=90) as described above.

In another aspect of the invention, the powdered glass accounts for about 35–95% by weight of the mixture of the powdered glass and the dielectric powder and more preferably about 40 to 70%. The dielectric powder therefore accounts for 5–65%, preferably 30–60%, by weight of the mixture.

In a still other feature of the invention, the thick-film capacitor is used as a load capacitor for a ceramic oscillator.

According to the present invention, the dielectric paste makes it possible to form a compact dielectric film whose electrostatic capacitance has a positive temperature coefficient when performing only one screen printing operation and performing a baking operation below 870° C. Therefore, use of the dielectric paste permits fabrication of a thick-film capacitor having reliable moisture resistance. Furthermore, use of the novel thick-film capacitor enables manufacture of a small-sized ceramic oscillator which is low in height and incorporates a capacitor.

Other objects and features of the invention will appear in the course of the description thereof, which follows.

DETAILED DESCRIPTION OF THE PREFERRED EMBODIMENTS

Figure 1:
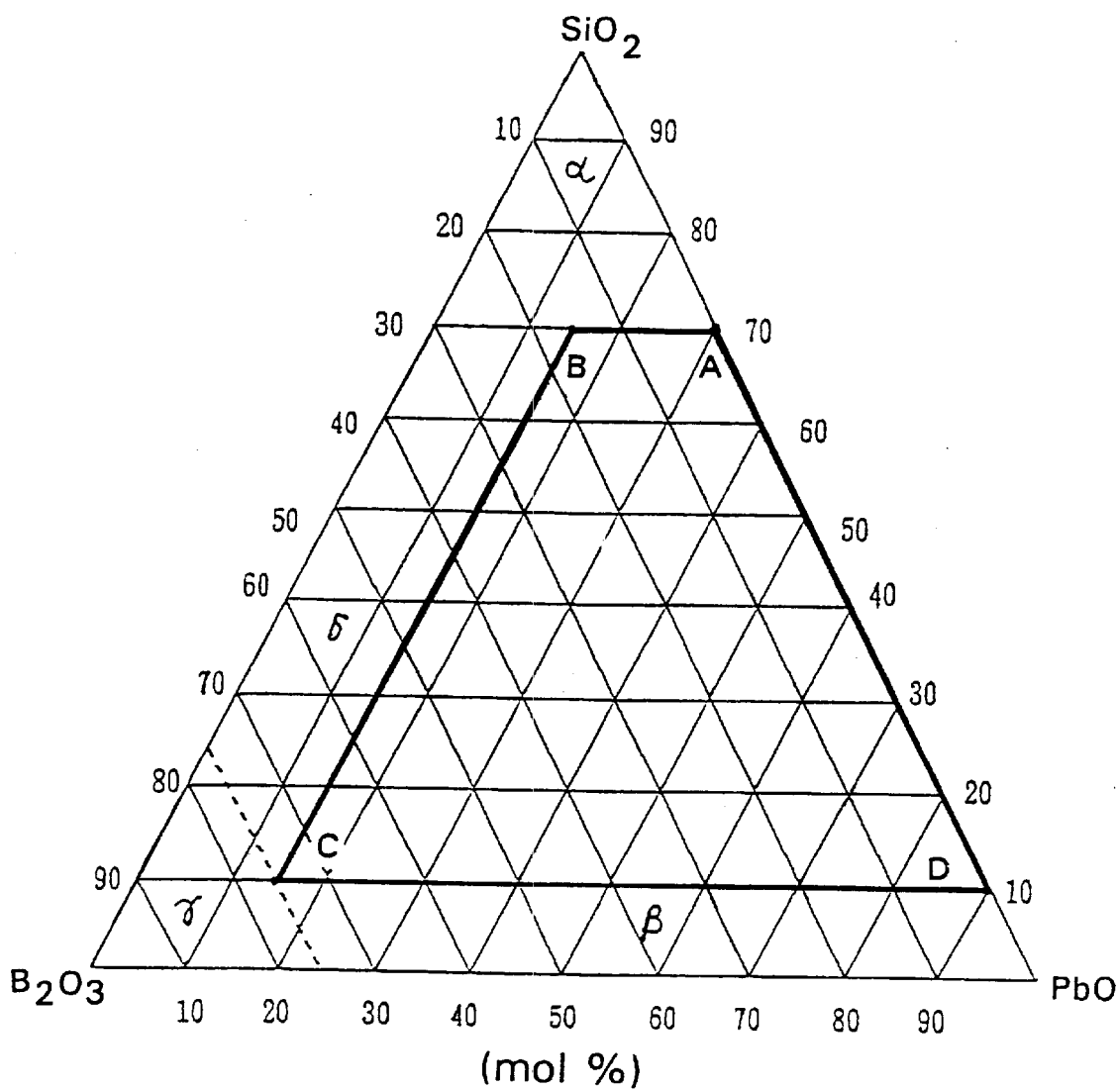
FIG. 1 is a ternary diagram depicting the composition of a glass according to the present invention.

A dielectric paste of the present invention includes powdered glass, dielectric powder, and an organic vehicle. The dielectric powder is made from a lead-based perovskite compound. The powdered glass includes a main component given by the chemical formula of $xSiO_2$—$yB_2O_3$—$zPbO$ (where x, y, and z are expressed in mole percent). As shown in FIG. 1, x, y, and z are preferably within a region defined by connecting points A (x=70, y=0, and z=30), B (x=70, y=15, and z=15), C (x=10, y=75, and z=15), and D (x=10, y=0, and z=90).

In the case where the composition ratio of the powdered glass falls in the region α in the ternary diagram of FIG. 1, i.e., the powdered glass is enriched with $SiO_2$, the softening point of the obtained glass is too high. As a result, it is impossible to obtain a dielectric film by baking the paste at a temperature below 900° C.

On the other hand, in the case where the composition ratio of the powdered glass is in the region β, i.e., the powdered glass includes less $SiO_2$, the viscosity of the obtained glass drops when the glass is melted. Therefore, the glass component flows out of the dielectric paste and diffuses out when the dielectric paste is baked. As a result, it is difficult to obtain a uniform dielectric film having desired dimensions. Undesirable electrical shorts also occur in the capacitor prepared using the dielectric paste.

In the case where the composition ratio of the powdered glass falls in the regions γ and δ, respectively, i.e., the powdered glass includes much $B_2O_3$ and less PbO, respectively, and the obtained glass has a water-soluble properties and less durability against humidity.

With respect to the added components included in the powdered glass, it is preferable that the aforementioned powdered glass contains more than about 70 mole percent of the main component and less than about 30 mole percent of at least one additive selected from the group consisting of $Al_2O_3$, CaO, $TiO_2$, $ZrO_2$, BaO and MgO. If the total amount of the added components is in excess of about 30 mole percent, then the obtained glass has a higher softening point. As a result, it is impossible to obtain a uniform dielectric film by baking at a temperature below 900° C.

According to the dielectric paste of the preferred embodiment, a dense dielectric film can be obtained by applying the dielectric paste just a one screen printing operation and firing the applied dielectric paste at a temperature below 870° C.

Furthermore, by using a lead-based perovskite compound having a Curie point lying within the range of from 120 to 500° C. as the dielectric powder in the dielectric paste, a thick-film capacitor whose electrostatic capacitance shows a positive temperature characteristic is obtained. Such compounds are known in the art.

If the powdered glass accounts for about 35–95% by weight of the mixture of the powdered glass and the dielectric substance in the dielectric paste, and if the powdered dielectric substance accounts for about 5–65% by weight of the mixture, then a more compact dielectric film is derived.

Hereinafter, preferred embodiments of the present invention are explained in more detail.

EXAMPLE 1

Figure 2:
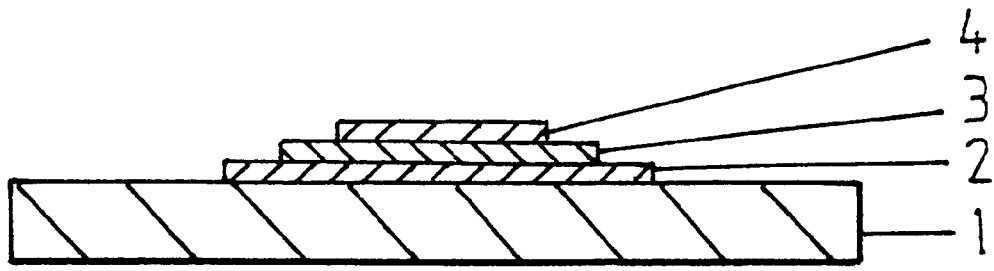
FIG. 2 is a cross-sectional view of a thick-film capacitor according to the invention, the capacitor being formed on a dielectric substrate.

FIG. 2 is a cross-sectional view of a thick-film capacitor formed on an insulating substrate 1. The thick-film capacitor includes a bottom conductor 2, a dielectric layer 3, and a top conductor 4. The dielectric layer 3 is interposed between the top conductor 4 and the bottom conductor 2 and formed by applying a dielectric paste according to the invention and baking the paste.

First, the dielectric paste was prepared. $SiO_2$, $B_2O_3$, PbO, $Al_2O_3$, CaO, $TiO_2$, $ZrO_2$, BaO and MgO were prepared as starting components for the glass. These materials were mixed so that glass compositions listed in Table 1 were obtained. The obtained mixtures were melted at temperatures of 1100–1500° C., thus giving rise to molten glass. The molten glass was poured into pure water to rapidly cool the glass. The glass was then pulverized, thus obtaining a powdered glass.

TABLE 1

| Sample No. | Glass Composition (mole %) | | | | | | | | |
|---|---|---|---|---|---|---|---|---|---|
| | $SiO_2$ | $B_2O_3$ | PbO | $Al_2O_3$ | CaO | $TiO_2$ | $ZrO_2$ | BaO | MgO |
| 1-1 | 70 | 0 | 30 | 0 | 0 | 0 | 0 | 0 | 0 |
| 1-2 | 70 | 15 | 15 | 0 | 0 | 0 | 0 | 0 | 0 |
| 1-3 | 10 | 75 | 15 | 0 | 0 | 0 | 0 | 0 | 0 |
| 1-4 | 10 | 0 | 90 | 0 | 0 | 0 | 0 | 0 | 0 |
| 1-5 | 55 | 15 | 30 | 0 | 0 | 0 | 0 | 0 | 0 |
| 1-6 | 40 | 10 | 20 | 30 | 0 | 0 | 0 | 0 | 0 |
| 1-7 | 40 | 10 | 20 | 0 | 30 | 0 | 0 | 0 | 0 |
| 1-8 | 40 | 10 | 20 | 0 | 0 | 30 | 0 | 0 | 0 |
| 1-9 | 40 | 10 | 20 | 0 | 0 | 0 | 30 | 0 | 0 |
| 1-10 | 40 | 10 | 20 | 0 | 0 | 0 | 0 | 30 | 0 |
| 1-11 | 40 | 10 | 20 | 0 | 0 | 0 | 0 | 0 | 30 |
| 1-12 | 45 | 10 | 25 | 5 | 5 | 5 | 5 | 0 | 0 |

Meanwhile, a ceramic consisting of a lead-based perovskite compound satisfying the formula $(Pb_{0.97}Sr_{0.03})\{(Sb_{0.5}Sn_{0.5})_{0.05}Zr_{0.46}Ti_{0.49}\}O_3$ and having a Curie point of 280° C. was pulverized, thus obtaining a dielectric powder.

The powdered glass, dielectric powder, and an organic vehicle were mixed and kneaded together at a weight ratio of 35:35:30, respectively, to create a dielectric paste. The organic vehicle was obtained by dissolving an acrylic resin in α-terpineol.

Using the dielectric paste obtained in this way, the thick-film capacitor as shown in FIG. 2 was fabricated. Specifically, an alumina substrate was prepared as an insulating substrate 1. An Ag/Pd paste layer was formed on the substrate by screen printing. The paste layer was fired at 850° C. to form a bottom conductor 2 having a diameter of 8 mm. The bottom conductor 2 was used as one electrode of a capacitor. Then a layer of the previously prepared dielectric paste was formed on the bottom conductor 2 by screen printing and baked at temperatures listed in Table 2. In this way, a disk-like dielectric layer 3 having a diameter of 6 mm was formed on the bottom conductor 2. Subsequently, a layer of a thermosetting Ag paste was formed on the dielectric layer 3 by screen printing and heated. Thus, a top conductor 4 having a diameter of 4 mm was formed on the dielectric layer 3. The top conductor 4 was used as the other electrode of the capacitor. In this manner, samples of thick-film capacitor were completed.

TABLE 2

| Sample No. | Firing Temperature (° C.) | Electrostatic Capacitance (pF) | Dielectric Loss (%) | Relative Dielectric Constant $\epsilon_r$ | Insulation Resistance log IR (Ω) | TCC (%/° C.) |
|---|---|---|---|---|---|---|
| 1-1 | 870 | 116 | 0.5 | 21 | >9 | 0.04 |
| 1-2 | 870 | 105 | 0.5 | 19 | >9 | 0.04 |
| 1-3 | 770 | 104 | 0.6 | 19 | >9 | 0.04 |
| 1-4 | 770 | 193 | 1.0 | 35 | >9 | 0.07 |
| 1-5 | 850 | 128 | 0.5 | 23 | >9 | 0.04 |
| 1-6 | 850 | 110 | 0.4 | 20 | >9 | 0.05 |
| 1-7 | 850 | 127 | 0.6 | 23 | >9 | 0.05 |
| 1-8 | 850 | 140 | 0.7 | 25 | >9 | 0.05 |

TABLE 2-continued

| Sample No. | Firing Temperature (° C.) | Electrostatic Capacitance (pF) | Dielectric Loss (%) | Relative Dielectric Constant $\epsilon_r$ | Insulation Resistance log IR (Ω) | TCC (%/° C.) |
|---|---|---|---|---|---|---|
| 1-9 | 850 | 138 | 0.6 | 25 | >9 | 0.05 |
| 1-10 | 850 | 141 | 0.5 | 25 | >9 | 0.04 |
| 1-11 | 850 | 128 | 0.5 | 23 | >9 | 0.04 |
| 1-12 | 850 | 168 | 0.6 | 30 | >9 | 0.06 |

The characteristics of each sample of capacitor including the bottom conductor 2 and the top conductor 4 as counter electrodes were measured to evaluate the characteristics of the dielectric layer 3. More specifically, electrostatic capacitances and dielectric losses were measured at a frequency of 1 MHz, a voltage of 1 V rms, and a temperature of 25° C. The relative dielectric constant $\epsilon_r$ of each sample was calculated from the obtained electrostatic capacitance and from the dimensions of the capacitor. Also, a dc voltage of 100 V was applied for 1 minute to measure the insulation resistance IR. Furthermore, the temperature coefficient of the electrostatic capacitance (TCC) in the temperature range of from −20 to 80° C. was measured at a frequency of 1 MHz and at a voltage of 1 V rms. The results are listed in Table 2.

As apparent from Table 2, the use of the novel dielectric paste makes it possible to obtain thick-film capacitors having relative dielectric constants of 19–35, dielectric losses of less than 1.0%, logarithmic insulation resistances exceeding 9Ω, and positive temperature coefficients of electrostatic capacitance of 0.04–0.07%/°C. These thick-film capacitors could be obtained by performing the baking below 870° C.

EXAMPLE 2

The powdered glass of sample Nos. 1–12 in Example 1 and dielectric powder of Pb-based perovskite also used in Example 1 were mixed at ratios given in Table 3. An organic vehicle was added to the mixture such that the mixture of the powdered glass and dielectric powder was 70 weight ratio of the combination. They were kneaded together to prepare a dielectric paste. The organic vehicle was prepared by dissolving an acrylic resin in α-terpineol, in the same way as in Example 1.

TABLE 3

| Sample No. | Powdered Glass (wt. %) | Dielectric Powder (wt. %) |
|---|---|---|
| 2-1 | 95 | 5 |
| 2-2 | 90 | 10 |
| 2-3 | 70 | 30 |
| 2-4 | 50 | 50 |
| 2-5 | 40 | 60 |
| 2-6 | 35 | 65 |
| *2-7 | 30 | 70 |
| *2-8 | 10 | 90 |

Then, using these samples of dielectric paste, thick-film capacitors were fabricated in the same way as in Example 1. The characteristics of the obtained thick-film capacitors, i.e., electrostatic capacitances, dielectric losses, relative dielectric constants, insulation resistances, and TCCs, were obtained. The results are given in Table 4. The samples marked with an asterisk (*) in Tables 3 and 4 are outside the scope of the present invention.

TABLE 4

| Sample No. | Electrostatic Capacitance (pF) | Dielectric Loss (%) | Relative Dielectric Constant $\epsilon_r$ | Insulation Resistance log IR (Ω) | TCC (%/° C.) |
|---|---|---|---|---|---|
| 2-1 | 78 | 0.3 | 14 | >9 | 0.02 |
| 2-2 | 90 | 0.4 | 16 | >9 | 0.03 |
| 2-3 | 128 | 0.5 | 23 | >9 | 0.05 |
| 2-4 | 168 | 0.6 | 30 | >9 | 0.06 |
| 2-5 | 250 | 0.7 | 45 | >9 | 0.08 |
| 2-6 | 360 | 1.0 | 65 | >9 | 0.09 |
| *2-7 | 450 | 1.1 | 80 | <9 | 0.10 |
| *2-8 | 730 | 1.2 | 130 | <9 | 0.14 |

As shown in Table 4, the ratio between the powdered glass and the dielectric powder is preferably so set that the powdered glass accounts for about 35–95% by weight and the dielectric powder accounts for about 5–65% by weight in the novel dielectric paste. Specifically, where the powdered glass accounts for less than 35% by weight and thus the dielectric powder accounts for more than 65% by weight, the dielectric loss increases as in sample Nos. 2–7 and 2–8, and the insulation resistance (IR) drops with undesirable results. This indicates that if the powdered glass accounts for less than 35% by weight, and if the dielectric paste is printed once and a baking operation is performed at 850° C., then it is impossible to obtain a compact film. In this case, the characteristics such as the reliability of the moisture resistance deteriorate.

EXAMPLE 3

Figure 3:
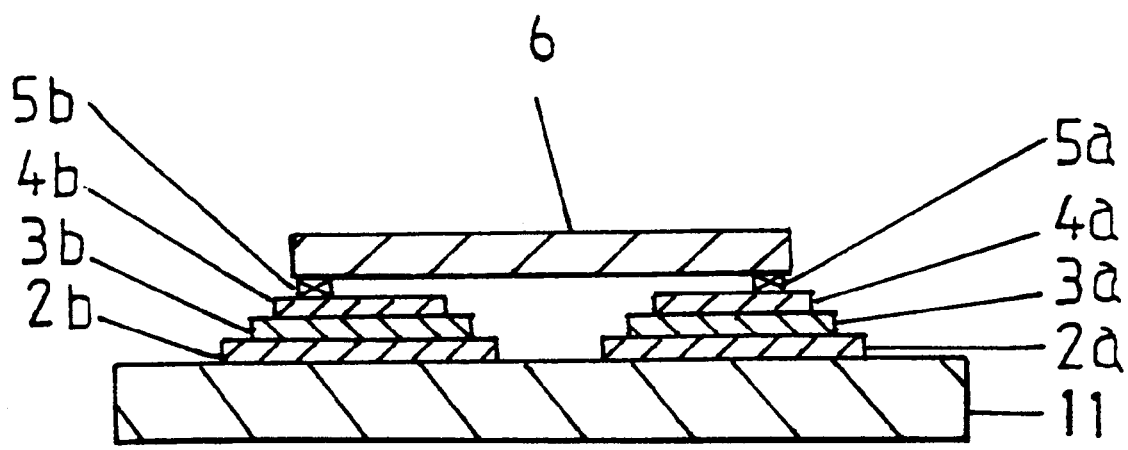
FIG. 3 is a cross-sectional view of a ceramic oscillator incorporating a thick-film capacitor according to the invention.

A ceramic oscillator incorporating a thick-film capacitor using the novel dielectric paste is described by referring to FIG. 3, which is a cross-sectional view of the ceramic oscillator obtained according to the present example. This ceramic oscillator is formed on an insulating substrate 11 and includes bottom conductors 2a and 2b, dielectric layers 3a and 3b, top conductors 4a and 4b, conductive adhesives 5a and 5b, and a resonant element 6 consisting of a piezoelectric ceramic. The dielectric layers 3a and 3b are obtained by applying and baking the dielectric paste.

A method of fabricating the ceramic oscillator is described below. First, the dielectric paste was prepared. $SiO_2$, $B_2O_3$, PbO, $Al_2O_3$, CaO, $TiO_2$ and $ZrO_2$ were prepared as starting materials for the glass. These materials were mixed so that the glass compositions listed in Table 5 were obtained. Then powdered glass was obtained in the same way as in Example 1. The obtained powdered glass and the dielectric Pb-based perovskite powder used in Example 1 were mixed at the ratios given in Table 5. An organic vehicle was added to the mixture such that the mixture of the powdered glass and the dielectric powder was 70 weight percent of the combination. The ingredients were kneaded together to create a dielectric paste. The organic vehicle was obtained by dissolving an acrylic resin in α-terpineol, in the same manner as in Example 1.

TABLE 5

| Sample No. | Powdered Glass Composition (mole %) | | | | | | | Powdered Glass Amount (wt. %) | Dielectric Powder Amount (wt. %) |
|---|---|---|---|---|---|---|---|---|---|
| | SiO$_2$ | B$_2$O$_3$ | PbO | Al$_2$O$_3$ | CaO | TiO$_2$ | ZrO$_2$ | | |
| 3-1 | 45 | 10 | 25 | 5 | 5 | 5 | 5 | 95 | 5 |
| 3-2 | 45 | 10 | 25 | 5 | 5 | 5 | 5 | 50 | 50 |
| 3-3 | 45 | 10 | 25 | 5 | 5 | 5 | 5 | 35 | 65 |

Ceramic oscillators of the construction shown in FIG. 3 were fabricated using the samples of dielectric paste obtained as described above.

First, an alumina substrate was prepared as the insulating substrate 11. An Ag/Pd paste layer was formed on the substrate by screen printing. The paste layer was baked at 850° C. to form islands of bottom conductors 2a and 2b which were 2.5 mm square. The bottom conductors 2a and 2b were used as one electrode of capacitors, respectively. Then a layer of the previously prepared dielectric paste was formed on the islands of the bottom conductors 2a and 2b by screen printing and baked at 850° C. In this way, islands of dielectric layers 3a and 3b which were 2.0 mm square was formed on the islands of the bottom conductors 2a and 2b, respectively. Subsequently, a layer of a thermosetting Ag paste was formed by screen printing and heated. Thus, islands of the top conductors 4a and 4b which were 1.5 mm square were formed on the islands of dielectric layers 3a and 3b, respectively. The top conductors 4a and 4b were used as the other electrodes, respectively. The resonant element 6 consisting of a PZT piezoelectric ceramic was bonded to the islands of top conductors 4a and 4b with conductive adhesives 5a and 5b. In this way, a ceramic oscillator incorporating the thick-film capacitor shown in FIG. 3 was completed.

The initial variations of the oscillation frequencies of the obtained samples of ceramic oscillator, the temperature characteristics of the oscillation frequencies in the range of from −40 to 125° C., and the resonant resistances were measured. The results are listed in Table 6.

TABLE 6

| Sample No. | Initial Variations of Oscillation Frequency (%) | Temperature Characteristics of Oscillation Frequency (%) | Resonant Resistance (Ω) |
|---|---|---|---|
| 3-1 | 0.2 | 0.15 | 17 |
| 3-2 | 0.2 | 0.07 | 17 |
| 3-3 | 0.2 | 0.03 | 17 |

As can be seen from Table 6, ceramic oscillators whose oscillation frequencies vary only a little can be obtained by using thick-film capacitors which employ the novel dielectric paste. Furthermore, the thick-film capacitors can be used as load capacitors in ceramic oscillators. Hence, small-sized ceramic capacitors which are low in height and which incorporate small capacitors can be manufactured.

In the above-described examples, the dielectric substance consisting of a lead-based perovskite compound is given by $(Pb_{0.97}Sr_{0.03})\{(Sb_{0.5}Sn_{0.5})_{0.05}Zr_{0.46}Ti_{0.49}\}O_3$. It is to be noted that the present invention is not limited to this composition. Rather, various lead-based perovskite compounds can be used. Examples include $PbTiO_3$, $PbTiO_3$—$Pb(Mg_{1/3}Nb_{2/3})O_3$, $PbTiO_3$—$Pb(Mg_{1/2}W_{1/2})O_3$, $PbTiO_3$—$Pb(Zn_{1/3}Nb_{2/3})O_3$, $PbZrO_3$, $PbZrO_3$—$Pb(Mg_{1/3}Nb_{2/3})O_3$, $PbZrO_3$—$Pb(Mg_{1/2}W_{1/2})O_3$, $PbZrO_3$—$Pb(Ni_{1/2}W_{1/2})O_3$, $PbZrO_3$—$Pb(Zn_{1/3}Nb_{2/3})O_3$, and $Pb(Zn_{1/3}Nb_{2/3})O_3$. By setting the Curie point to within the range of 120–500° C., thick-film capacitors whose electrostatic capacitances have positive temperature characteristics can be obtained.

In the above examples, an acrylic resin dissolved in α-terpineol was used as the organic vehicle for the dielectric paste. The present invention is not limited to this. Resinous components can be ethylcellulose resins, nitrocellulose resins, and butyral resins, as well as the above-described organic vehicles. Usable solvent components include alcoholic solvents (such as butyl Carbitol), esteric solvents (such as butyl Carbitol acetate and ester acetate), and kerosene. Furthermore, according to the application intended, a plasticizer such as phthalic ester may be added.

Moreover, the novel dielectric paste is not limited to the above-described case in which a thick-film capacitor is formed on an alumina substrate. It is also possible to fabricate a capacitor on a dielectric substrate such as a multilayer ceramic substrate.

In the above-described examples, the bottom layer of electrode of the thick-film capacitor is made from baked Ag/Pd, while the top layer of electrode is made from thermosetting Ag. Alternatively, the bottom layer of electrode may be made from baked Ag, Ag/Pt, or Au, and the top layer of electrode may be made from baked or thermosetting Ag, Ag/Pt, Au, Ag/Pd, or Cu.

As can be understood from the description provided thus far, the novel dielectric paste makes it possible to form a compact dielectric film whose electrostatic capacitance has a positive temperature coefficient by performing only one screen printing operation and performing a baking operation below 870° C. Accordingly, use of the novel dielectric paste permits fabrication of a thick-film capacitor having reliable moisture resistance. Furthermore, use of the novel thick-film capacitor enables manufacture of a small-sized ceramic oscillator which is low in height and incorporates a capacitor.

What is claimed is:

1. A thick-film capacitor comprising a dielectric layer comprising a glass and a lead-based perovskite dielectric, said glass comprising a main component given by $xSiO_2$—$yB_2O_3$—$zPbO$ in which x, y, and z are expressed in mole percent and lie within a region defined by connecting points A (x=70, y=0, and z=30), B (x=70, y=15, and z=15), C (x=10, y=75, and z=15), and D (x=10, y=0, and z=90) on a ternary diagram.

2. The thick-film capacitor of claim 1, wherein said dielectric has a Curie point lying within a range of from about 120 to 500° C.

3. The thick-film capacitor of claim 2, wherein said glass contains more than about 70 mole percent of said main component and less than about 30 mole percent of at least one additive, said at least one additive being selected from the group consisting of $Al_2O_3$, CaO, $TiO_2$, $ZrO_2$, BaO and MgO.

4. The thick-film capacitor of claim 3, wherein said glass contains at least about 80 mole percent of said main component.

5. The thick-film capacitor of claim 4, wherein based on the total weight of said glass and said dielectric, said glass is about 35–95% by weight and said dielectric is about 5–65% by weight.

6. The thick-film capacitor of claim 5, wherein based on the total weight of said glass and said dielectric, said glass is about 40–90% by weight and said dielectric is about 10–60% by weight.

7. The thick-film capacitor of claim 1, wherein said glass contains more than about 70 mole percent of said main component and less than about 30 mole percent of at least one additive, said at least one additive being selected from the group consisting of $Al_2O_3$, CaO, $TiO_2$, $ZrO_2$, BaO and MgO.

8. The thick-film capacitor of claim 1, wherein based on the total weight of said glass and said dielectric, said glass is about 35–95% by weight and said dielectric is about 5–65% by weight.

9. In a ceramic oscillator including a load capacitor, utilizing the thick-film capacitor of claim 1 as said load capacitor.

10. In a ceramic oscillator including a load capacitor, utilizing the thick-film capacitor of claim 6 as said load capacitor.

11. The thick film capacitor of claim 1, wherein said lead-based perovskite dielectric comprises $(Pb_{0.97}Sr_{0.03})\{(Sb_{0.5}Sn_{0.05})_{0.05}Zr_{0.46}Ti_{0.29}\}O_3$.

12. The thick film capacitor of claim 1, wherein said lead-based perovskite dielectric comprises a material selected from the group consisting of $PbTiO_3$—$Pb(Mg_{1/3}Nb_{2/3})O_3$, $PbTiO_3$—$Pb(Mg_{1/2}W_{1/2})O_3$, $PbTiO_3$—$Pb(Zn_{1/3}Nb_{2/3})O_3$, $PbZrO_3$, $PbZrO_3$—$Pb(Mg_{1/3}Mb_{2/3})O_3$, $PbZrO_3$—$Pb(Mg_{1/2}W_{1/2})O_3$, $PbZrO_3$—$Pb(Ni_{1/2}W_{1/2})O_3$, $PbZrO_3$—$Pb(Zn_{1/2}Nb_{1/2})O_3$ and $Pb(Zn_{1/3}Nb_{2/3})O_3$.

* * * * *